Nov. 12, 1935. R. H. JORDAN 2,020,946
REFRIGERATING DEVICE
Filed Aug. 25, 1933 3 Sheets-Sheet 1

WITNESSES:
C. J. Weller
C. F. Bryant

INVENTOR
Richard H. Jordan.
BY
ATTORNEY

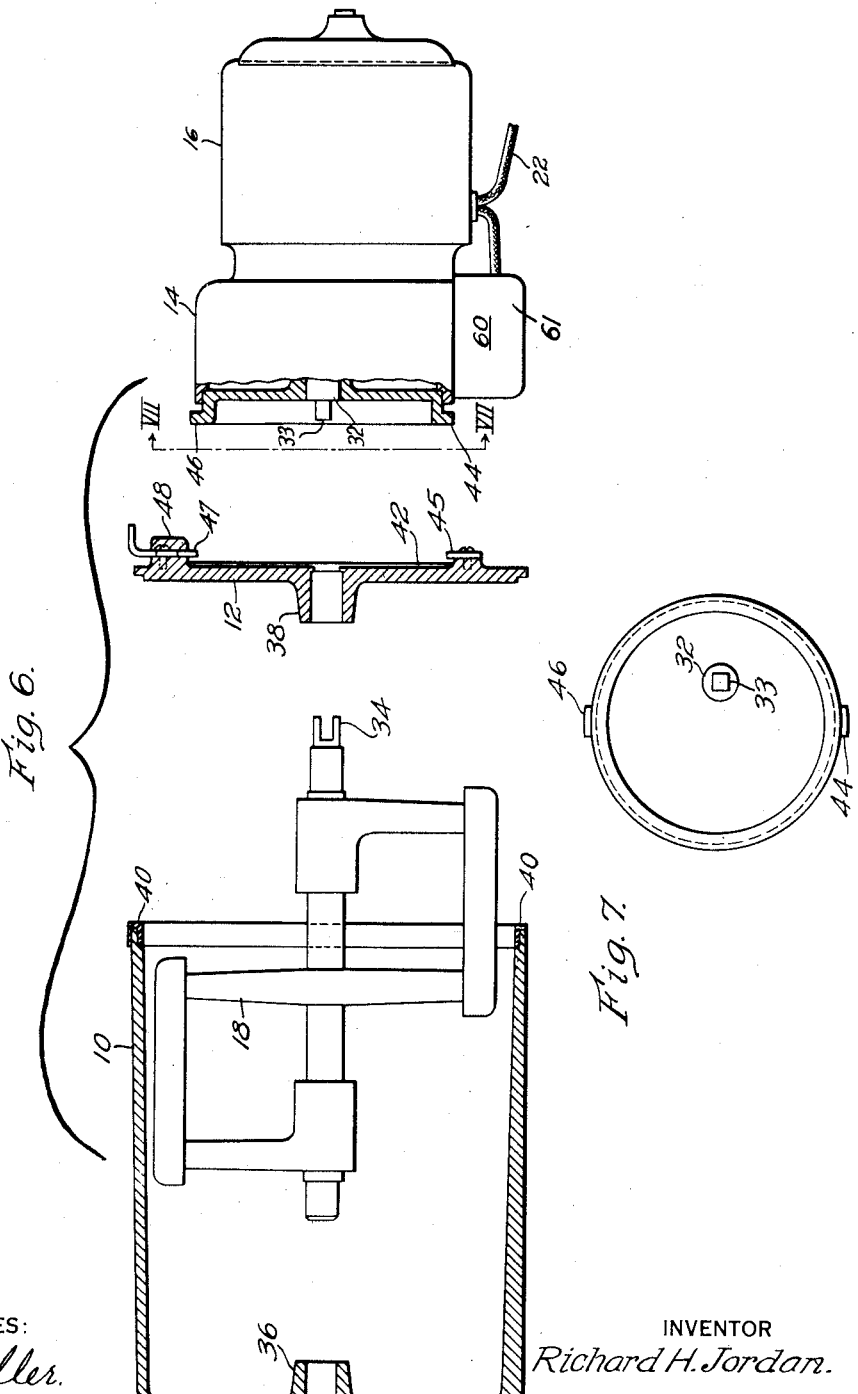

Nov. 12, 1935.  R. H. JORDAN  2,020,946
REFRIGERATING DEVICE
Filed Aug. 25, 1933  3 Sheets-Sheet 3
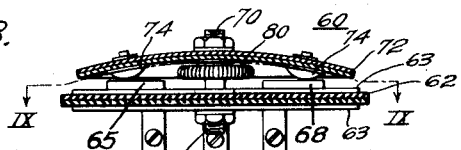
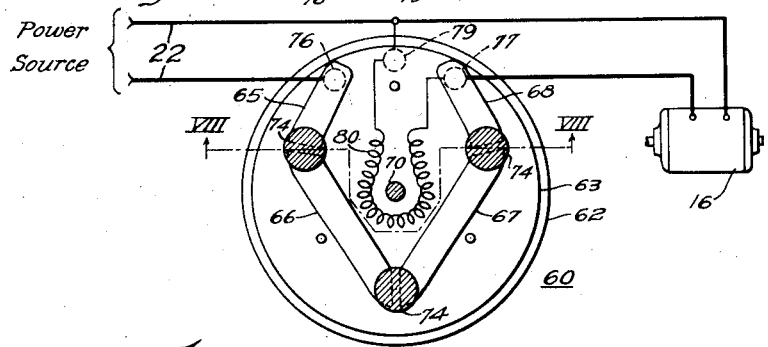
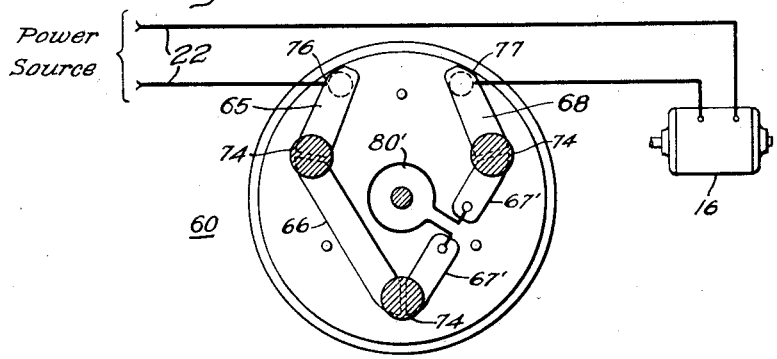
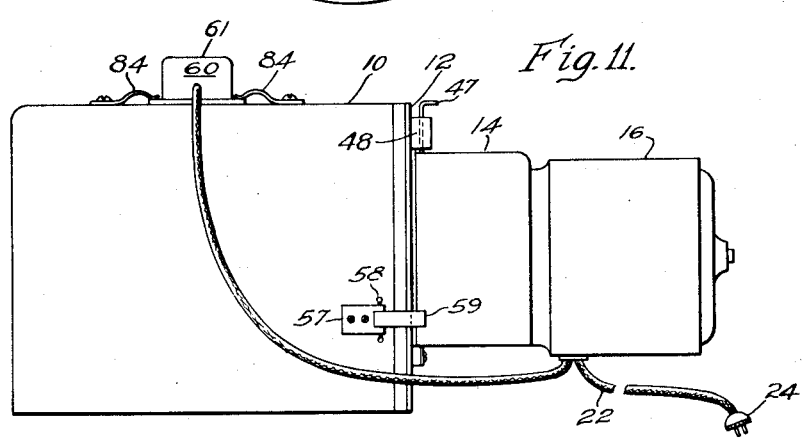
WITNESSES:
INVENTOR
Richard H. Jordan.
BY
ATTORNEY Patented Nov. 12, 1935

2,020,946

UNITED STATES PATENT OFFICE 2,020,946

REFRIGERATING DEVICE

Richard H. Jordan, Springfield, Mass., assignor to Westinghouse Electric & Manufacturing Company, East Pittsburgh, Pa., a corporation of Pennsylvania Application August 25, 1933, Serial No. 686,762

16 Claims. (Cl. 62—4)

My invention relates to domestic-type freezing devices and it has particular relation to ice-cream freezers adapted to be used in electric household refrigerators.

For years ice-creams and ices for table use have been formed by agitating the ingredients within a container surrounded by ice, preferably packed with salt to form a refrigerating brine, until the ingredients have congealed or solidified. This method of freezing cream is, however, exceedingly laborious and inconvenient. Consequently, with the relatively wide-spread adoption of electrically-operated domestic refrigerators which has taken place in recent years, attempts have been made to utilize the cooling medium of such refrigerators as a substitute for ice in the freezing process. Thus far, however, none of these attempts has proved entirely successful.

It is a well known fact that ice-cream cannot successfully be made unless agitated to reduce the size of the crystalline structures which are formed as the mixture freezes. To effect this necessary stirring of the mixture in refrigerator-type freezers, electric motors energized from the refrigerator supply circuit have been utilized, and it has, in this application, been found highly preferable to directly attach the motor to the cream-container assemblage.

In the majority of household refrigerators the cooling compartments or ice-forming chambers into which the ice-cream freezer and its driving motor may be placed are of limited cooling capacity. Difficulty has thus been encountered from the heat losses dissipated by the motor, it having been found, for example, that when the motor is of sufficient capacity to properly stir the mixture being frozen, its losses when continuously operated so burden the refrigerator that the cream-freezing process is unduly retarded or even prematurely interrupted.

Consequently, in order to minimize the heat dissipation, it has been necessary, in freezers of the type under consideration, to build the motors so weak as to be incapable of stirring the cream after it has become slushy. Needless to say, the completed product cannot, when made in a freezer so equipped, be up to the desired standard of fineness, since agitation by the motor is in such cases prematurely discontinued.

My invention is directed to an improved ice-cream freezer for use in domestic refrigerators which overcomes the disadvantages named and which possesses additional advantages to be particularized hereinafter.

Generally stated, the object of my invention is to provide a motor-driven ice-cream freezer which will satisfactorily function with domestic refrigerators of the usual limited cooling capacity.

A more specific object of my invention is to provide a control system for motor-driven freezers adapted for refrigerator use which allows the capacity of the motor to greatly exceed the limitation imposed by its continuously-running heat losses.

Another object of my invention is to provide an automatic control system for ice-cream freezers which will allow the agitating motor to be energized only after the mixture within the freezer has been cooled to a temperature closely approaching the freezing point.

An additional object of my invention is to provide a control system which will discontinue motor energization as soon as the temperature to which the freezer is subjected rises above the freezing point.

A further object of my invention is to provide a form of control for a motor-driven ice-cream freezer which protects the motor from damage when the freezer is inadvertently left connected to its supply circuit after the mixture has completely solidified.

A still further object of my invention is to provide an improved form of mechanical construction for motor-driven ice-cream freezers adapted for use with domestic refrigerators.

Extensive tests have revealed that vigorous agitation during regularly recurring short periods of time is as satisfactory in the making of ice cream as is a more moderate agitation maintained continuously. Hence, in practicing my invention I attain the first-named objects by equipping the freezer with a relatively strong motor and providing a control system which causes the motor to be energized intermittently, rather than continuously. Inasmuch as the motor dissipates heat only when energized, by making the periods during which it is running short as compared with the periods of deenergization, the total or effective heat loss dissipated will be proportionately reduced and a motor sufficiently strong to continue the intermittent agitation of the mixture until it has practically completely solidified may thus be applied without appreciably burdening the cooling capacity of the refrigerator with which the ice-cream freezer is used.

To effect the intermittent energization, any suitable timing device may, of course, be used. In practice, however, I have found that thermostatically operated control means are preferable for this purpose, inasmuch as they provide additional automatic control features not otherwise obtainable. For example, by mounting a properly designed motor-control thermostat on the freezer assemblage, I have found that after pouring the initially warm cream mixture into the container and placing the assembled freezer in the ice-making compartment of the refrigerator, energization of the motor may be delayed until the mixture has been cooled to a point approximating the freezing temperature at which point the thermostat will initially complete the motor circuit.

Suitable heating means provided in conjunction with the thermostat is rendered effective simultaneously with the motor energization, and after the expiration of several seconds sufficiently raises the temperature to cause the thermostat to interrupt the motor and heater circuits. The motor remains deenergized until the thermostat has again cooled down to the critical temperature to accomplish which cooling a much longer period is preferably required. Another energization of the motor and heater will then result and the operations just described will be repeated as long as the freezer is connected to a suitable source of power and is located in the refrigerator.

Since the periods of motor energization are much shorter than the periods of deenergization, a solidification of the mixture sufficient to stall the motor will cause no damage whatever, the motor being capable of withstanding locked energization for these short periods.

My invention itself, together with additional objects and advantages thereof, will best be understood through the following description of a specific embodiment, when taken in conjunction with the accompanying drawings in which:

Fig. 6 is a view partly in section and partly in side elevation of the ice-cream freezer when taken apart illustrating the four major assemblages of which it is made up;

Fig. 7 is an end view, taken on line VII—VII of Fig. 6, of the gear-box bracket which attaches to the removable cover of the freezer container;

Fig. 8 is a view, taken along the line VIII—VIII of Fig. 9, showing the construction of the bimetallic disc thermostat device utilized to control the freezer motor;

Fig. 9 is a sectional view, taken along line IX—IX of Fig. 8, of the thermostat showing the manner in which it is connected in the motor energizing circuit;

Fig. 10 is a plan view of a thermostat modified to permit an alternative form of connection in the motor circuit; and, Fig. 11 is a side elevational view of the complete freezer assemblage showing the motor-control thermostat mounted in direct contact with the cream container.

Figure 1:
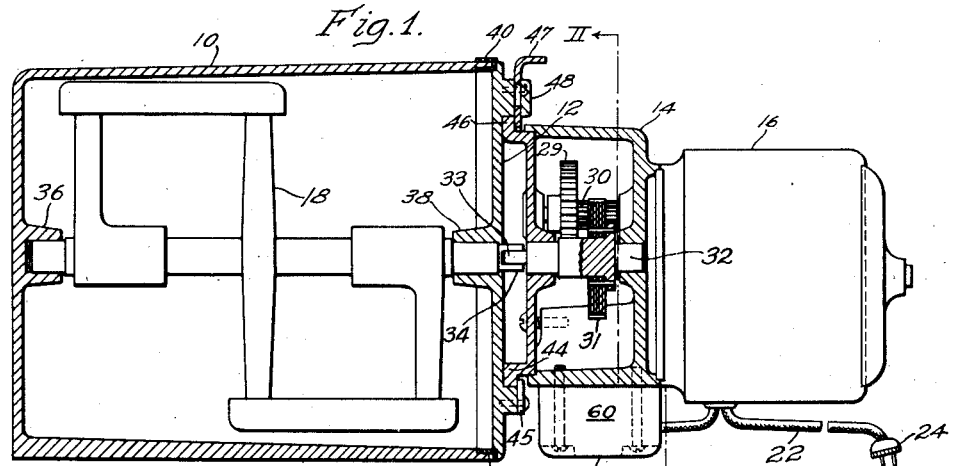
Figure 1 is a side elevation view, partly in section, of the ice-cream freezer of my invention.
Figure 3:
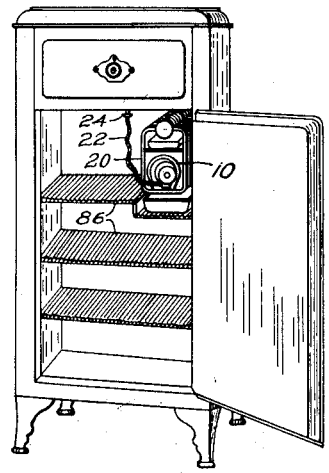
Fig. 3 is a perspective view of a domestic refrigerator showing the ice-cream freezer of my invention inserted into the ice-making compartment or evaporator-coil assemblage thereof.

Referring to the drawings, and particularly to Fig. 1 thereof, the improved ice-cream freezer of my invention comprises a cylindrical container 10, the open end of which is covered by a detachable lid or cover 12 to which is removably secured a gear box 14 carrying an electric motor 16 which drives, through reduction gearing, an agitator or beater 18 disposed inside of the container. The entire assemblage is designed for lengthwise insertion into the ice-making compartment 20 of a domestic refrigerator shown in Fig. 3, an energizing circuit for the motor 16 being established through a flexible cord 22 terminating in a plug connection 24 which may be inserted into an outlet receptacle (not shown) suitably provided on an interior wall, for example, of the refrigerator.

Figure 2:
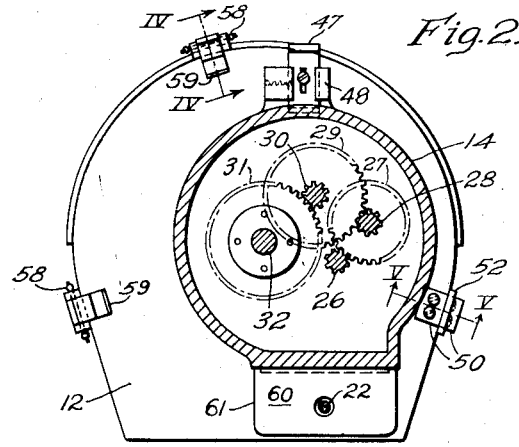
Fig. 2 is a sectional view taken on line II—II of the device of Fig. 1.

As is shown more clearly in Fig. 2, the motor 16 (Fig. 1) carries on the end of its shaft a pinion 26 which engages a gear wheel 27 to cause a second pinion 28 to drive gear wheel 29, which in turn rotates, through a third pinion 30, a gear wheel 31 mounted on the output shaft 32 of the gear box 14. The end of shaft 32 is provided with a squared portion 33 (Figs. 1 and 6) which fits into a similarly shaped recess in the end 34 of the shaft upon which the agitator 18 is mounted. This agitator shaft is carried by suitable journals or bearings 36 and 38, formed, respectively, in the end of the cream container 10 and the container cover 12.

As shown more clearly in Fig. 6, when disassembled, the ice-cream freezer comprises four separate parts or assemblages, the cream container 10, the agitator 18, the removable cover 12 and the gear box and motor assemblage 14—16. The cover 12, when placed in position against the end of the container 10 bears against a suitable gasket 40 of rubber or other resilient material, which effects a liquid-tight seal and is of such composition as not to be attacked by the cream or to taint the same.

Figure 4:
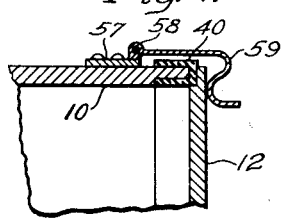
Fig. 4 is an enlarged sectional view taken on line IV—IV of Fig. 2, showing the details of the cover-holding spring clips utilized by the freezer.
Figure 5:
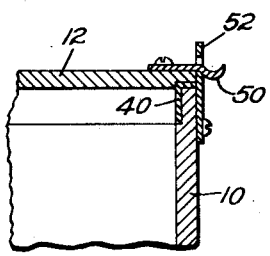
Fig. 5 is an enlarged sectional view taken on line V—V of Fig. 2 showing the details of the hook-clip device which also holds the cover.

As shown in Figs. 2 and 5, the cover 12 carries on one side thereof a plate-like projection 50 which fits into an opening in a cooperating member 52 fixed to the wall of the container 10. At properly spaced points around the circumference of the open end of the container are spring clamping members 59. As shown more clearly in Fig. 4, each of these clamping devices comprises a bracket 57, fixed to the container wall, to which is attached by means of a hinge pin 58, a strip spring member 59 which hooks over the edge of cover plate 12 and holds it firmly against the gasket 40 carried by the edge of the container 10.

The motor and gear box assemblage 14—16 is positioned in a suitably formed circular recess 42 (Fig. 6) in the side of the cover plate 12 and held therein at the bottom by means of a projection 44, which is first inserted behind a small plate member 45 fixed to the cover plate 12, and at the top by means of a similar projection 46 which is engaged by a laterally movable latch device 47 carried by a projection 48 near the top of the cover plate.

To control the motor in such a manner that it will be operated intermittently only, rather than continuously, as has been the practice heretofore, I provide a thermostat assemblage, indicated generally at 60, shown as being mounted on the lower side of the gear box 14 and surrounded by a suitable cover 61. In the utilization of such special control, it is possible, as has been pointed out, to make motor 16, which may be of any suitable type though preferably of the universal variety capable of operating either from an alternating-current or a direct-current supply circuit, of sufficient capacity to satisfactorily stir the mixture being frozen without introducing into the cooling compartment of the refrigerator objectionably large heat losses. The details of the thermostatic control means 60 are shown more clearly in Figs. 8 and 9, in which is illustrated a thermostat of the bimetallic disc type. The thermostat is carried by a base 62 on both sides of which are positioned sheets 63 of insulating material which serve to insulate the plurality of stationary contact members 65 to 68, inclusive, from each other and from the base 62. Supported from the center of the base by means of a suitable bolt or stud 70 is a bimetal disc 72 which carries a plurality of contact members or buttons 74, which in the downwardly biased position illustrated, serve to electrically connect successive pairs of the stationary contact members 65 to 68.

The thermostatic disc 72 is preferably of the type disclosed in U. S. Patent 1,448,240 to J. A. Spencer. The disc there disclosed has the characteristic that when subjected to a temperature up to a predetermined value, the curvature of the disc is in one direction, and when cooled to a temperature of a second predetermined value, the curvature is caused to reverse in direction with a snap action. Thus the disc has two opposed limiting positions corresponding to two temperatures of different predetermined values, the difference between which may be determined by the particular heat treatment and manufacturing processes applied to the bimetal material of which the disc is made up.

In order that electrical connections may be established with the stationary contact members 65 and 68, a pair of binding posts 76 and 77 are mounted on the thermostat base 62 and a third binding post 79 is supplied to establish connections with an electrical heating element 80 which is in the form of a coil of high resistance wire inserted between the bimetal disc 72 and the supporting base.

The preferred manner of connecting the thermostat 60 into the circuit which energizes the freezer motor 16 is illustrated in Fig. 9 in which connections from the domestic power circuit are illustrated in the form of conductors 22. In one of these conductors is inserted the thermostat contact members connected to the binding posts 76 and 77. When the contact members 74 carried by the bimetal disc 72 are biased downwardly into engagement with the cooperating stationary contact members of the thermostat, the energizing circuit for motor 16 is completed. However, when the disc 72 is caused by an appropriate temperature change to snap over into the oppositely or upwardly curved position in which the contact members 74 are biased away from the stationary members, the motor circuit is interrupted.

The circuit interrupting operation of the thermostat is controlled by the heater 80 which is connected through binding post 79 directly with one side of the power source circuit and through the contact members of the thermostat with the other side of the circuit, so that it is energized simultaneously with the motor 16. By designing the thermostat disc 72 in such manner that a predetermined low temperature will cause it to snap into the circuit-closing position, in which the motor and heater are energized, and so that a predetermined higher temperature produced by the action of the heater 80 will cause the disc to snap into the opposite or circuit-interrupting position, the desired intermittent energization of the freezer motor 16 may very satisfactorily be obtained.

When, as is shown in Figs. 1 and 2, the thermostat 60 is mounted on the gear box 14, which form of mounting is preferable since it provides a unitary construction of the motor and its control means, I have found it preferable to design the disc so that it will effect completion of the motor circuit when the thermostat temperature drops just below freezing or in the region of 30° F. and disconnection at a considerably higher temperature of the thermostat, preferably of the order of 80 to 100° F. It will, of course, be understood that basically the thermostat merely acts as a timing device and that insofar as this particular functioning is concerned, any other timing means could be applied with equal success. However, since the thermostat possesses additional features tending to make starting of the freezer automatic, it is the particular type of timing means that I prefer to utilize.

The before-mentioned tests in the intermittent stirring of the ice-cream mixture during the freezing process indicated that if the mixture is stirred vigorously for three or four seconds out of each three or four minutes, the completed product will be as fine grained and as high quality as were the stirring to be continued without interrupting during the entire freezing period. Consequently, I prefer to design the thermostat in such manner that the time-on to the time-off ratio of motor energization will be of the order of 1 to 60 or thereabouts, which means that the capacity of the motor for a given total dissipation of heat within the refrigerator chamber may be made many times as great as were continuous operation to be effected.

In operation of the complete ice-cream freezer and control system just described, the mixture to be frozen having been poured into the container 10, the agitator is inserted, the cover plate 12 is clamped on, and the assemblage comprising the gear-box, motor and thermostat is attached to the cover plate. The freezer is then inserted lengthwise into the ice-making compartment or evaporator 20 (Fig. 3) of the domestic refrigerator and the plug connection 24 is inserted into the receptacle, to connect with the electrical circuit from which the refrigerator is energized. The refrigerator door having been closed, no more attention need be given the device until sufficient time has elapsed to effect a complete freezing of the mixture.

Until the initially warm mixture has cooled down sufficiently to allow the disc 72 (Fig. 8) of the thermostat 60 to approach the freezing temperature, the thermostat will maintain the motor circuit in the interrupted condition, the bimetal disc normally remaining in the open-contact position when subjected to temperatures above 30° F. as before pointed out. However, after a cooling of the mixture nearly to the freezing point, which allows the exterior of the freezer including the thermostat to attain the low temperature of 30°, the disc 72 snaps to the circuit-closing position and energizes the motor 16 which starts to rotate the agitator 18. Simultaneous with the motor energization the heater element 80 starts to raise the temperature of the thermostat and after several seconds, warms the disc 72 to the point where it snaps over to the opposite position and interrupts the motor energization to discontinue the rotation of the freezer agitator.

A much longer time is required for the disc 72 to cool down to the freezing temperature than was required for it to be raised by the closely positioned heater 80 since the dissipation of the heat by the disc is relatively small, due to the surrounding cover 61 and other thermal insulation, this time being, as before mentioned, preferably of the order of several minutes. When the disc has again cooled to the predetermined low temperature it moves the contacts to the circuit-closing position and reenergizes the motor and heater. This energization continues for the same time as in the first instance, as does also the succeeding period of deenergization. The process just described is repeated as long as the motor and thermostat are connected to the supply circuit, so that the mixture being frozen is stirred several seconds out of each several minutes.

When the mixture has become completely solidified, or sufficiently so to stall the agitator, no damage results to the motor if disconnection thereof from the supply circuit is not made, for the reason that the periods of energization are relatively short and hence do not persist long enough, in view of their relatively long separation, to overheat or otherwise damage the motor. This feature eliminates the necessity for providing relatively complicated and expensive means for disconnecting the motor from the supply circuit when the torque demands of the agitator reach a predetermined value, and hence contributes to the simplicity and economy of the ice-cream freezer.

For a thermostat having given characteristics comparable t those already mentioned, it will be apparent hat both the periods of motor energization and deenergization may be varied by changing the output of the thermostat heater 80 in the first instance, and of the rate at which it dissipates its heat in the second instance. If the capacity of the heater is increased, a shorter time will be required for the disc to heat up to the circuit-opening temperature and the periods of motor energization will be correspondingly shortened. A decrease in heater capacity will, of course, have an opposite effect and tend to lengthen the periods of motor energization.

In a similar manner by increasing the rate at which the thermostat disc 72 will dissipate its heat the periods of motor deenergization may be shortened. In practice, such an increase may be effected by reducing the thermal insulation between the disc and the surrounding atmosphere inside of the refrigerator compartment, or by mounting the thermostat on a portion of the freezer which is of a lower or cooler temperature.

When mounted on the gear box 14, as shown in Figs. 1 and 2, the thermostat 60 is subjected to a temperature intermediate that of the cream container 10 and that of the motor 16. It, therefore, cools off more quickly than were it to be mounted in direct contact with the motor 16, the heat losses of which tend to raise its temperature, and less quickly than were it to be mounted in contact with the cream container 10, which is of a temperature at or slightly below freezing.

This latter form of mounting is illustrated in Fig. 11 in which the thermostat 60 is shown as being attached directly to the cream container 10 by suitable holding means in the form of spring clips 84. I have found that so great is the increase in heat dissipation from a thermostatic disc when so mounted, that the periods of motor deenergization are reduced from several minutes when the thermostat is mounted on the gear box 14 to several seconds when positioned on the cream can. I have also found that by mounting the thermostat on the motor the dissipation from the disc is so retarded that the periods of motor deenergization are made exceedingly long.

As soon as the ice-cream freezer is removed from the ice forming chamber or evaporator 20 of the refrigerator into a temperature which is above freezing, no further energization of the motor can take place. Hence, a transfer of the freezer to one of the shelves 86 of the refrigerator shown in Fig. 3 will, without removing the plug connection 24, serve to maintain the motor in a deenergized condition continuously since the temperature in the vicinity of the shelf is above the critical value necessary to start motor operation. This feature is of advantage in keeping the cream cool or in temporarily discontinuing the freezing operation, since it automatically prevents the agitator from being operated until the freezer is returned to the ice-making chamber. It can, therefore, be connected to the outlet circuit indefinitely and will never run as long as it is kept outside of the chamber or evaporator 20.

In the event that it is desired to dispense with the automatic starting control feature pointed out and retain only the intermittent operation control or timing function of the thermostat, this device may be mounted outside of the refrigerator or in any convenient location providing the circuit-completing temperature of the thermostat is made such as to be above the ambient temperature of its surroundings.

In Fig. 10 I have illustrated a second manner of connecting the heating element of the thermostat to effect the timing function. In this particular connection the element 80', which is of a low resistance type in contrast to the high resistance element 80 shown in Fig. 9, is disposed in series with the motor 16, it being connected to bridge the gap formed by removing a portion of stationary contact member 67' of the thermostat. When so connected, energization of the motor effected by closure of the thermostat contacts causes the motor current to traverse the heater 80', which acts in the manner already explained to raise the temperature of the thermostat disc and interrupt the motor circuit. Whereas the periods of motor energization are constant and independent of the motor load for the connection of Fig. 9, the series connection of the heater shown in Fig. 10 provides periods of energization which vary inversely with the square of the motor current. That is, as the motor load increases the periods of its energization repeatedly become shorter, which, in certain applications, may be of advantage.

Although I have shown and described a certain specific embodiment of my invention, I am fully aware that many modifications thereof are possible. It is obvious also that while I have elected to illustrate and describe one form of my invention as applied to a specific process, my invention may, in its broader aspect, be applied to other kinds of work. Thus it may be applied to chemical processes where a substance is to be agitated at a predetermined substantially constant ambient temperature value and the agitation is to be stopped in case of undue temperature change. My invention, therefore, is not to be restricted except insofar as is necessitated by the prior art and by the scope of the appended claims.

I claim as my invention:

1. In combination with a domestic refrigerator having an evaporator-coil assemblage, an ice-cream freezer disposed to be inserted into said assemblage, a driving motor attached to said freezer, and thermo-responsive motor-control means adapted to intermittently effect energization of the motor for relatively short periods of time spaced by longer periods of motor deenergization.

2. In combination with an ice-less refrigerator having an evaporator coil assemblage, an ice-cream freezer disposed to be placed in close proximity to said assemblage, a driving motor mounted upon said freezer, switching means for the motor, and thermo-responsive timing means for intermittently actuating said switching means.

3. In combination with an ice-cream freezer adapted for use in the cooling compartment of a domestic refrigerator, a driving motor mounted upon said freezer, and motor control means for effecting an intermittent energization of the motor to thereby reduce the heat losses dissipated into the compartment by the motor.

4. In combination with a domestic refrigerator having an ice-making compartment of relatively limited freezing capacity, an ice-cream freezer disposed to be inserted into said compartment, a driving motor attached to said freezer, and motor control means for intermittently effecting energization of the motor, the function of said control means being to reduce the heat dissipated by the motor into the said refrigerator compartment.

5. In combination with an ice-cream freezer adapted for use in a domestic refrigerator, a motor for driving said freezer, and thermostatic motor control means for effecting a motor energizing connection only after the mixture placed in the freezer has been cooled to a temperature closely approaching the freezing point.

6. In combination with a household refrigerator having an ice-making compartment, an ice-cream freezer disposed to be inserted into said compartment, a driving motor for said freezer, and temperature-responsive motor control means disposed to effect a motor-energizing connection as soon as the mixture placed in the freezer has been cooled to a temperature closely approaching the freezing point.

7. In combination with an ice-cream freezer adapted for use in a domestic refrigerator, a motor for driving said freezer, and thermostatic motor control means for effecting a deenergization of the motor in the event that the temperature to which the freezer is subjected rises above the freezing point.

8. In combination with a household refrigerator having an ice-making compartment, an ice-cream freezer disposed to be inserted into said compartment, a driving motor for said freezer, a source of power for said motor, and temperature-responsive control means disposed to effect a disconnection of the motor from said source of power as soon as the temperature of the medium surrounding the freezer rises above the freezing point.

9. In combination with an ice-cream freezer adapted for use in a domestic refrigerator, a driving motor for said freezer, a source of power for said motor, and control means, in the form of a thermostat, for intermittently connecting the motor with the power source, said thermostat comprising a bimetallic member, contact-making means actuated thereby, and a heater for raising the temperature of said bimetallic member, said contact-making means being disposed intermediate the source of power and the motor and said heater being connected to be energized simultaneously with the motor, the characteristics of said thermostat being such that it effects energization of the motor and heater when the temperature of the bimetallic member is reduced to a value slightly above the temperature to which the thermostat is subjected during normal operation of the freezer and discontinues said energization when the heater has raised the temperature of the bimetallic member to a substantially higher value.

10. A control system for a motor-driven ice-cream freezer adapted for use in a domestic refrigerator comprising, in combination with a source of power for the freezer motor, a thermostat having a bimetal member, contact members, disposed intermediate the motor and the power source, actuated by said bimetal member, and a heater connected to be energized simultaneously with the motor, for raising the temperature of said bimetal member, the characteristics of the thermostat being such that it effects energization of the motor and heater when the temperature of the bimetal member is reduced to a value slightly above the ambient temperature of the thermostat and discontinues said energization when the heater has raised the temperature of the bimetal member to a substantially higher value.

11. In combination with a domestic refrigerator having an ice-making compartment and a source of power associated therewith, an ice-cream freezer adapted to be inserted into said compartment, said freezer comprising a freezing container, a detachable cover therefor, an agitator disposed within the container, an electric motor, energizable from said source of power, carried by said cover, means for operatively connecting the motor with said agitator, and a thermostat mounted upon the structure of said freezer for effecting a control of the motor energization.

12. In combination with a domestic refrigerator having an ice-making compartment and a power circuit associated therewith, an ice-cream freezer adapted to be inserted into said compartment, said freezer comprising a freezing container, a detachable cover therefor, an agitator disposed within the container, an electric motor, energizable from said power circuit, carried by said cover, means for operatively connecting the motor with said agitator, and a thermostat mounted upon the structure of said freezer for effecting a control of the motor energization, the characteristics of said thermostat being such that energization of the motor can be effected only when the ambient temperature of the freezer is below the freezing point.

13. An ice-cream freezer adapted for use in a domestic refrigerator comprising, in combination, a cream container, a removable cover therefor, an agitator disposed within the container, an electric motor supported from said cover, means for operatively connecting the motor with the agitator, and a thermostat for effecting an intermittent energization of the motor, said thermostat being mounted upon the freezer structure.

14. An ice-cream freezer adapted for use in a domestic refrigerator comprising, in combination, a cream container, a removable cover therefor, an agitator disposed within the container, an electric motor supported from said cover, means for operatively connecting the motor with the agitator, a source of power for the motor, and a thermostat for effecting an intermittent energization of the motor from the said power source, said thermostat being mounted upon the freezer structure and comprising contact members connected intermediate the motor and the power source, a bimetal element disposed to engage said contact members when the bimetal temperature is lowered to a value slightly below freezing and to disengage said members when the bimetal temperature is raised considerably above the freezing value, and a heater, connected to be energized simultaneously with the motor, for raising the temperature of said bimetal element.

15. In combination with a container for receiving a substance to be subjected to agitation at a certain substantially constant ambient temperature, an agitator therein, a motor for driving the agitator and an electric circuit for energizing the motor, of circuit controlled timing means effective to control the motor when the timing means and container are subjected to said substantially constant ambient temperature and effective to prevent energization of the motor when subjected to a higher substantially constant ambient temperature.

16. In combination with means for effecting a change of condition of a substance by intermittent agitation thereof at a certain substantially unvarying ambient temperature, said means including a motor driven agitator, of a thermally actuated motor control means effective to sequentially energize and deenergize the motor when said control means is subjected to a temperature not greater than said certain ambient value and to preclude energization of the motor when subjected to a higher temperature.

R. H. JORDAN.